United States Patent
Maranhao et al.

(10) Patent No.: US 7,421,612 B1
(45) Date of Patent: Sep. 2, 2008

(54) METHOD AND SYSTEM FOR OPTIMIZED SWITCHOVER OF REDUNDANT FORWARDING ENGINES

(75) Inventors: Marcus A. Maranhao, Irvine, CA (US); Michael Roy Smith, Morgan Hill, CA (US); John M. Knight, Lake Forest, CA (US); Rohit Shrivastava, Santa Clara, CA (US); Ana H. Burghelea, Columbus, OH (US)

(73) Assignee: Cisco Technology, Inc., San Jose, CA (US)

( * ) Notice: Subject to any disclaimer, the term of this patent is extended or adjusted under 35 U.S.C. 154(b) by 638 days.

(21) Appl. No.: 10/341,028

(22) Filed: Jan. 13, 2003

Related U.S. Application Data

(63) Continuation-in-part of application No. 10/273,022, filed on Oct. 17, 2002.

(51) Int. Cl.
G06F 11/00 (2006.01)
(52) U.S. Cl. .................... 714/4; 370/217; 370/220; 370/228
(58) Field of Classification Search .................... 714/4
See application file for complete search history.

(56) References Cited

U.S. PATENT DOCUMENTS

| | | | |
|---|---|---|---|
| 5,331,631 A | 7/1994 | Teraslinna | 370/60 |
| 6,253,230 B1 * | 6/2001 | Couland et al. | 709/203 |
| 6,332,198 B1 * | 12/2001 | Simons et al. | 714/6 |
| 6,879,559 B1 * | 4/2005 | Blackmon et al. | 370/225 |
| 6,894,969 B1 * | 5/2005 | Chidambaran et al. | 370/216 |
| 6,894,970 B1 * | 5/2005 | McDermott et al. | 370/220 |
| 2003/0090997 A1 * | 5/2003 | Lindstrom | 370/228 |
| 2003/0117949 A1 * | 6/2003 | Moller et al. | 370/219 |

FOREIGN PATENT DOCUMENTS

| | | | | |
|---|---|---|---|---|
| EP | 1 202 504 A2 | 5/2002 | | 12/56 |
| EP | 1 202 599 A2 | 5/2002 | | 12/56 |
| WO | WO 99/11031 | 8/1998 | | |

OTHER PUBLICATIONS

Erwin P. Rathgeb, Wolfgang Fischer, Christian Hinterberger, Eugen Wallmeier, and Regina Wille-Fier; "The MainStreetXpress Core Services Node≦A Versatile ATM Switch Architecture for the Full Service Network;" pp. 795-806; IEEE Journal on Selected Areas in Communications, vol. 15, No. 5, Jun. 1997.

* cited by examiner

Primary Examiner—Yolanda L Wilson
(74) Attorney, Agent, or Firm—Campbell Stephenson LLP; Samuel G. Campbell, III

(57) ABSTRACT

A method of failure recovery in a network element is disclosed. The method includes indicating to a number of forwarding engines that a forwarding engine has completed a switchover operation and causing at least one of the forwarding engines to acknowledge that the forwarding engine has completed the switchover operation in response to the indication.

95 Claims, 8 Drawing Sheets

METHOD AND SYSTEM FOR OPTIMIZED SWITCHOVER OF REDUNDANT FORWARDING ENGINES

CROSS-REFERENCE TO RELATED APPLICATIONS

This application is a continuation-in-part of patent application Ser. No. 10/273,022, entitled "METHOD AND SYSTEM FOR PROVIDING REDUNDANCY WITHIN A NETWORK ELEMENT," filed Oct. 17, 2002, having D. Bhattacharya, M. R. Smith and K. Morishige as inventors, which is assigned to Cisco Technology, Inc., the assignee of the present invention, and is hereby incorporated by reference herein.

BACKGROUND OF THE INVENTION

1. Field of the Invention

The present invention relates to data communications, and, more particularly, to a method and apparatus for improved failure recovery in a network element.

2. Description of the Related Art

As more and more information is transferred over today's networks, businesses have come to rely heavily on their network infrastructure in providing their customers with timely service and information. Failures in such network infrastructures can be costly both in terms of lost revenue and idled employees. Thus, high reliability systems are becoming increasingly attractive to users of networking equipment.

Moreover, the need for routers, switches and other such network elements to provide ever-increasing packet processing rates with such high reliability, while maintaining a compact form factor, typically mandates the use of highly specialized ASICs (Application Specific Integrated Circuits) operating at very high frequencies, which consequently dissipate large amounts of heat. Such considerations further complicate the issue of appropriate chassis design. When one adds the requirement for high-availability (redundancy) to the above requirements, the problem is further complicated.

One example of a switch architecture provides port cards, catering to different types of physical interfaces, that feed their traffic into forwarding engines. Such forwarding engines support a form of distributed forwarding using specialized hardware that typically employ one or more ASICs. These forwarding engines are interconnected by means of a switching fabric. A routing processor (or multiple routing processors, for redundancy purposes) is also typically provided to manage exception handling and other tasks that cannot be managed by the forwarding engines.

The port cards are separated from the forwarding engine cards to allow multiple communications technologies to be accommodated using the same forwarding engine infrastructure. By designing a network element such that the network element's port card and forwarding engine functionality are separated, varying port card architectures can be used to support such multiple communications technologies (e.g., protocols, hardware interfaces, and so on), while employing the same basic forwarding engine architecture. It is therefore beneficial to avoid the need for multiple versions of forwarding engines in order to support different line interfaces. When one considers redundancy issues, however, such an approach involves the additional problem of handling the failure of a forwarding engine that provides forwarding functionality for a port card.

However, a balance must be struck between redundancy, and the physical and commercial restraints placed on such designs. As noted, while high-availability is desirable, the cost of such availability must be balanced against the cost of such a design, as well as the physical size and the thermal energy that must be dissipated. As redundant elements are added to a given architecture, that architectures availability (reliability) improves, but its cost also rises, as does its size and the thermal energy produced thereby. Thus, the amount of redundancy should be minimized, while still providing the requisite level of availability.

Such reliability can be viewed both in terms of the availability of the network element, and the effect of a failure and the restoration performed in response thereto. As noted, such a system should provide reliable service under the given conditions. In the event of a failure, such a system should also provide continuity of service, to the maximum degree possible (or, at least, to a commercially acceptable degree). In practice, this means that, should a failure occur, the data streams carried by the network element should experience minimal disruption, if indeed they experience any at all.

As is apparent from the preceding discussion, while providing high availability is certainly possible, providing such reliability in a cost-effective and commercially reasonable manner is challenging. As with most engineering problems, a solution that is not commercially reasonable, whether as a result of cost, complexity, physical requirements or the like, offers no real benefit to users (or to manufacturers). What is therefore needed is a way to provide for the reliable conveyance of data streams in an economically reasonable fashion. Moreover, such conveyance should be provided in a manner that, in the face of failures within the network elements carrying those data streams, causes minimal disruption to the services thus supported.

SUMMARY OF THE INVENTION

A network element architecture employing a method and system according to the present invention addresses the foregoing needs and so enjoys quick, efficient restoration of service in the event of a failure of one of its forwarding engines. As noted subsequently, such technique (referred to herein as an "individual-based switchover" technique) accomplishes this by treating each forwarding engine individually, carrying on the switchover and restoring the network element to service as soon as the copying of the appropriate information is completed, without the need to wait for a group of forwarding engines to complete their respective switchovers. Using this individual-based switchover technique, the incoming path's switchover can be decoupled from that of the outgoing path in order to further improve performance. This allows the incoming forwarding path of the given forwarding engine to return to service, while the forwarding engine's outgoing path is still undergoing the switchover. In doing so, the forwarding engine's incoming path is able to forward packets to other forwarding engines (whose outgoing paths have already completed the switchover, or which were not involved in the switchover), reducing restoral-to-service time.

In one embodiment of the present invention, a method is disclosed that includes receiving an indication that a forwarding engine should perform a switchover operation and performing the switchover operation in response to the receiving the indication. The switchover operation includes switching a coupling of the forwarding engine between a first interface card and a second interface card. The switchover operation is performed independently of another switchover operation. The other switchover operation is performed by another forwarding engine.

In another embodiment of the present invention, a method is disclosed that includes receiving an indication that a forwarding engine has completed a switchover operation. The indication is received at a one of a number of forwarding engines. The method also includes causing the one of the forwarding engines to acknowledge the indication in response to the receiving the indication that the forwarding engine has completed the switchover operation. The forwarding engine is one of the forwarding engines.

In yet another embodiment of the present invention, a method of failure recovery in a network element is disclosed. The method includes indicating to a number of forwarding engines that a forwarding engine has completed a switchover operation and causing at least one of the forwarding engines to acknowledge that the forwarding engine has completed the switchover operation in response to the indication.

In still another embodiment of the present invention, a forwarding engine is disclosed. The forwarding engine includes an ingress path, an egress path and a controller. The ingress path and the egress path are independent from one another. The controller is coupled to control the ingress path and the egress path independently.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
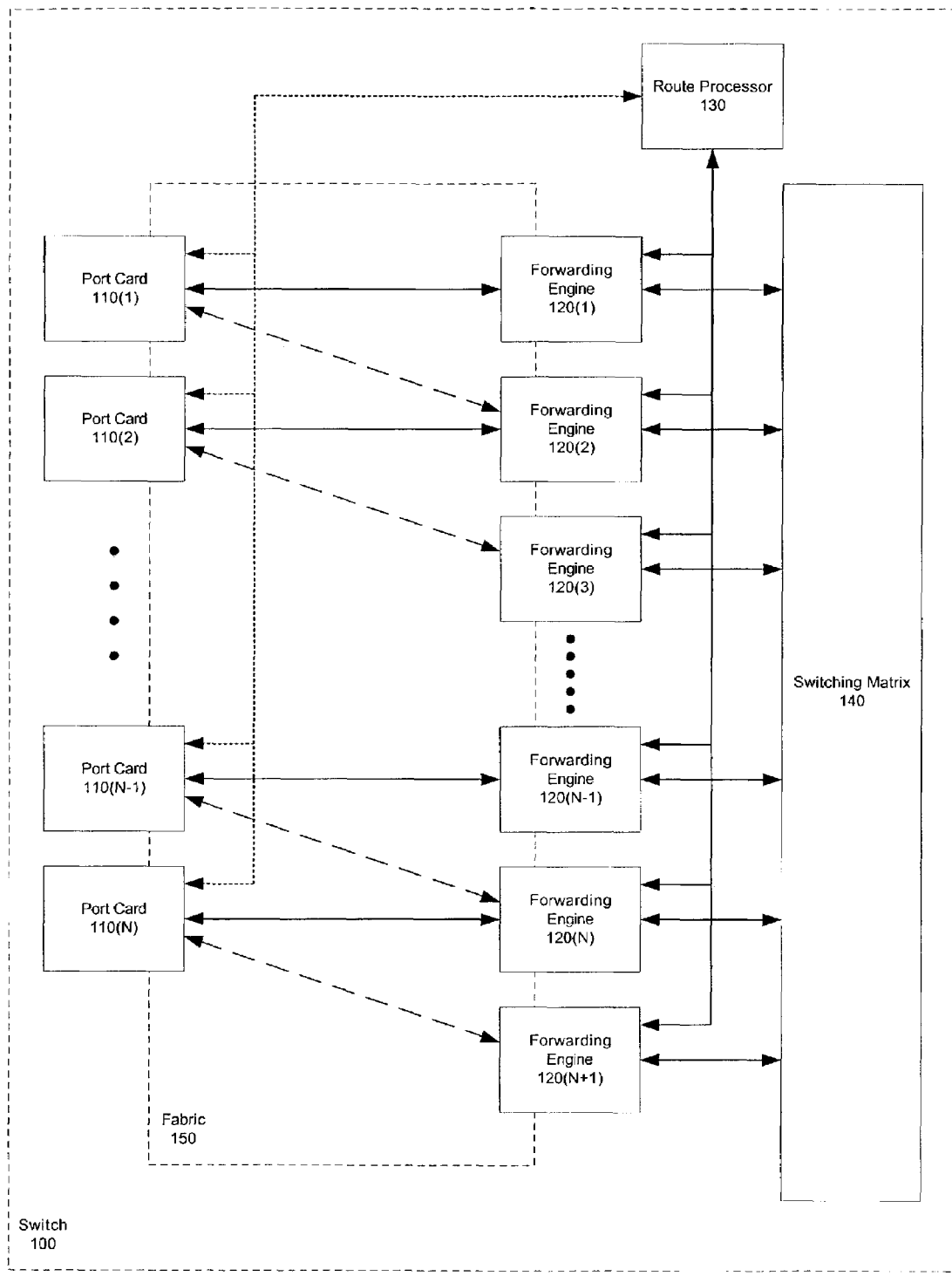
FIG. 1 is a block diagram illustrating a switch according to a forwarding engine redundancy scheme according to the present invention.

The following is intended to provide a detailed description of an example of the invention and should not be taken to be limiting of the invention itself. Rather, any number of variations may fall within the scope of the invention which is defined in the claims following the description.

Introduction

The present invention provides for the reliable conveyance of data streams in an commercially reasonable fashion. This reliability is achieved in a network element that employs separate port cards and forwarding engines by providing redundant forwarding engines (FEs) and supporting quick and efficient switchover between these FEs. Such a network element typically employs N+L FEs (e.g., N+1; where N is the number of port cards and L is the number of redundant (or standby) FEs) and a distributed switching fabric between the port cards and FEs (also referred to as a distributed fabric, or more simply, a fabric; where there are N port cards and M (=N+L) FEs).

More particularly, such a network element provides forwarding engine redundancy for high-availability service to a port card interface by providing, at a minimum, 1:N redundancy of the forwarding engines (or more generically, L:N redundancy). Specifically, such a network element supports a mechanism by which one forwarding engine can take over for another (failed) forwarding engine. Implementation of such an approach, though, requires a switching fabric between the port cards and the forwarding engines. Such a solution, however, is not feasible given other, more practical constraints (e.g., the need for a compact chassis and constrained heat dissipation). One compromise is to directly interconnect the port card interfaces to a small number (e.g., two) forwarding engines, thus forming a distributed switching fabric. This removes the need for a traditional switching fabric between the port card interfaces and the forwarding engines, and leaves the heat dissipation of the chassis at an acceptable level. Unfortunately, this compromise makes the task of providing a fast switchover from a failed forwarding engine to another forwarding engine much more complicated, because of the constraint that a forwarding engine is only connected to up to two port card interfaces. Specifically, the problem is that the failed forwarding engine, and the spare forwarding engine in the system may not be (and, typically, are not) connected to the same port card interface.

Thus, the present invention provides a method and system designed to address the FE switchover problem by treating each forwarding engine individually, managing the switchover and restoring the forwarding engine to service as soon as the copying of the appropriate information is completed, without the need to wait for a group of forwarding engines to complete their switchover. Because of the approach employed, the method is referred to herein as an "individual-based switchover" method.

This "individual-based switchover" method is also extensible. In one embodiment, this method decouples the switchover of the given FE's incoming path from the switchover of that FE's outgoing path. Such a method allows the incoming forwarding path of the given forwarding engine to return to service, while the FE's outgoing path is still undergoing the switchover. This allows the incoming path of the given forwarding engine to forward packets to other forwarding engines whose outgoing paths have already completed the switchover, or which were not involved in the switchover.

Thus, the restoral-to-service time from the forwarding engine's switchover is minimized.

The present invention offers a number of advantages. A network element architecture employing such a method and system enjoys quick, efficient restoration of service in the case of a failed FE. As noted, such an "individual-based switchover" technique accomplishes this by treating each forwarding engine individually, carrying on the switchover and restoring the network element to service as soon as the copying of the appropriate information is completed, without the need to wait for a group of forwarding engines to complete their respective switchovers. Using this individual-based switchover technique, the incoming path's switchover can be decoupled from that of the outgoing path in order to further improve performance. This allows the incoming forwarding path of the given forwarding engine to return to service, while the forwarding engine's outgoing path is still undergoing the switchover. In doing so, the forwarding engine's incoming path is able to forward packets to other forwarding engines (whose outgoing paths have already completed the switchover, or which were not involved in the switchover), reducing restoral-to-service time.

A switch according to the present invention, while providing quick, efficient restoration in the event of a failed FE, is comparable to or lower in cost than other possible solutions described subsequently. Moreover, the connections between port cards and FEs do not need to be routed through a central mux/demux, so there is less congestion in the connectivity infrastructure (e.g., in the midplane and/or backplane of the switch), which also lowers cost, improves reliability, and reduces heat dissipation needs, among other such advantages. Also, in comparison to an architecture that employs a central mux/demux, there is no need to design a high-MTBF central mux/demux, that can be expected to require its own redundancy. Such redundancy adds still more connections in the midplane/backplane, as well as more complexity with regard to the management of that redundancy, and failover of the central mux/demux. However, the present invention allows the distributed switching fabric to be switched in a fast, efficient manner, allowing users to enjoy reliable operation without having to endure overly-long failure restoration times. Thus, by addressing the need for reliability, while maintaining costs at a relatively low level, the present invention meets the needs of users for reliable switching, in an economically reasonable fashion.

An Example Network Element Architecture

FIG. 1 is a block diagram illustrating a network element (in this case, a switch) that employs a redundancy scheme that is supported by embodiments of the present invention. A switch 100 is illustrated in FIG. 1 as including a number of port cards (depicted as port cards 110(1)-(N)), a number forwarding engines (depicted as forwarding engines 120(1)-(N+1)), a route processor 130 and a switching matrix 140. It should be noted that, although not generally the case (as noted subsequently), the number of port cards (N) is related to the number of forwarding engines in this figure (N+1; or M (=N+L), in the more general case). Route processor 130 is coupled to control port cards 110(1)-(N) and forwarding engines 120(1)-(N+1). As is also depicted in FIG. 1, connections between port cards 110(1)-(N) and forwarding engines 120(1)-(N+1), as well as portions of these elements are taken in combination to represent a distributed switching fabric 150. Distributed switching fabric 150 represents a distributed multiplex/demultiplex arrangement that provides the connectivity necessary to support an N+1 forwarding engine redundancy scheme according to the patent application entitled "METHOD AND SYSTEM FOR PROVIDING REDUNDANCY WITHIN A NETWORK ELEMENT," as previously included by reference herein.

In the event of a failure, route processor 130 will typically take the actions necessary to react to failures in forwarding engines 120(1)-(N+1). This is because a failed forwarding engine may not be capable of accomplishing switchover, and the other forwarding engines may have no way to become aware of such a failure. This factor also highlights the benefit of each FE being able to switch over to its standby mode on its own, without requiring the transfer of information from another FE (which may have failed and be unable to provide such information).

The architecture of switch 100 can be generalized to one in which there are N port cards and M FEs. In this scenario, there are N primary FEs (also referred to herein as primary FEs) and L (where L=M−N) standby FEs. The interconnection of port cards to FEs can be accomplished in a number of ways, as is subsequently described in connection with the examples depicted in FIGS. 5 and 6. In this general scenario, each port card is coupled to a primary FE and a number (L) of standby FEs. The limit on L is N, for all practical purposes. This boundary case provides both a primary and standby FE for each port card, and so the arrangement devolves into an architecture similar to that of an architecture that employs a main FE and a backup FE for each port, with its attendant limitations.

Each port card is thus coupled to its corresponding L+1 FEs by a primary link and L standby links. As used here, a link is typically a transmission medium of some sort (e.g., a fiber optic cable, a coaxial cable or the like), and while this may include various types of signal processing (amplification, regeneration, bandwidth shaping or the like), such a transmission medium does not include any switching of data streams from any one source (e.g., port card or FE) to any one destination (e.g., FE or port card, respectively). As will be apparent to one of skill in the art, as the number L grows, so to does the number of standby links and FEs in the switch, with an attendant increase in complexity and cost. However, the increase in MTBF (and so reliability) provided by having multiple standby FEs may offset this increased complexity and cost to some extent, although this offset will likely tend to decrease rapidly as L is increased, making a large L relatively uneconomical (and in the boundary case, leading to the cost limitations previously noted). Using this architecture, one (or more) failed FE(s) is taken out of service, and the affected port cards (and those towards the standby FEs) shifted an appropriate number of FEs (equal to the number of failed FEs). Thus, if one FE fails, each port card connected to an FE between the failed FE and standby FE switches over (shifts) by one FE. The total number of FEs/port cards that need to be switched is equal to the number of FEs between the failed FE and the standby FE. In one scenario, this is accomplished in serial fashion, with one FE switching after another, and is referred to herein as a cascading technique. This technique is described in greater detail in the patent application entitled "METHOD AND SYSTEM FOR PROVIDING REDUNDANCY WITHIN A NETWORK ELEMENT," as previously included by reference herein.

In addition to being able to handle multiple simultaneous FE failures, such an architecture is able to handle multiple temporally sequential FE failures. So, after a first FE fails and the affected port cards are switched over, another failure results in the switchover of the newly-switched over port cards. In this manner, a switch employing this architecture is able to continue operating in the face of multiple FE failures. The trade-off is, of course, increased complexity and cost, but this may be warranted in a given application having significantly higher MTBF requirements.

It will be noted that the variable identifier "N" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of switch 100). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

An important feature of a switch architected according to the present invention (e.g., switch 100) is the distributed switching fabric (e.g., distributed switching fabric 150). In comparison to other alternatives, a distributed switching fabric provides a simpler, more effective and more elegant solution to the interconnection needs of the port cards and FEs. This simplicity translates into better reliability (higher MTBF) and lower cost, and so addresses the needs of users better than other alternatives. This is especially true of the N+1 technique, which reduces the distributed switching fabric to a 2 input mux/demux on each port card and FE. This type of architecture is described in greater detail with regard to FIGS. 2A and 2B.

In a typical embodiment, a forwarding engine contains two sections: an incoming path (ingress path, which contains the components that process packets received from the port card interfaces), and an outgoing path (egress path, which does further processing on the packets before sending them out to the port card interfaces). In general, a given packet received in a port card interface is passed to the forwarding engine to which the port card interface is connected. The packet is processed by the incoming path of the forwarding engine, switched via the switch fabric to another forwarding engine, the outgoing path of which further processes the packet prior to sending the packet out to the port card interface to which the other forwarding engine is connected.

As part of the processing in a forwarding engine, certain information such as forwarding, access control lists (a form of filtering), and other such information is typically consulted. This information is stored in conceptual/logical tables, which are stored in hardware in the form of random access memory (RAM), or in specialized memory called "ternary content addressable memory" (TCAM). The import of this fact is that while a particular forwarding engine is built with a certain amount of memory dimensioned to accommodate the "reasonable" amount of information expected of a port card interface, it cannot, in general, be assumed that this memory will be able to store such information for both port card interfaces connected to the given forwarding engine. This is especially true in architectures in which a forwarding engine acts as a standby for multiple port cards.

As a result, two general classes of forwarding engines must be considered when performing a switchover: a forwarding engine with double configuration in forwarding hardware (i.e., one in which the forwarding hardware can accommodate the configuration of both port card interfaces connected thereto), and a forwarding engine with a single configuration in forwarding hardware (i.e., one in which the forwarding hardware can accommodate only the configuration of one of the port card interfaces connected thereto). A consequence is that on forwarding engines with single configuration, the alternate configuration is kept in generic memory, and which, upon switchover, will need to be copied to the forwarding hardware memory. In fact, the case in which a forwarding engine has double configuration capability in one of its paths (e.g., the incoming path), but single configuration in the other path (e.g., the outgoing path), can also be considered.

Figure 2A:
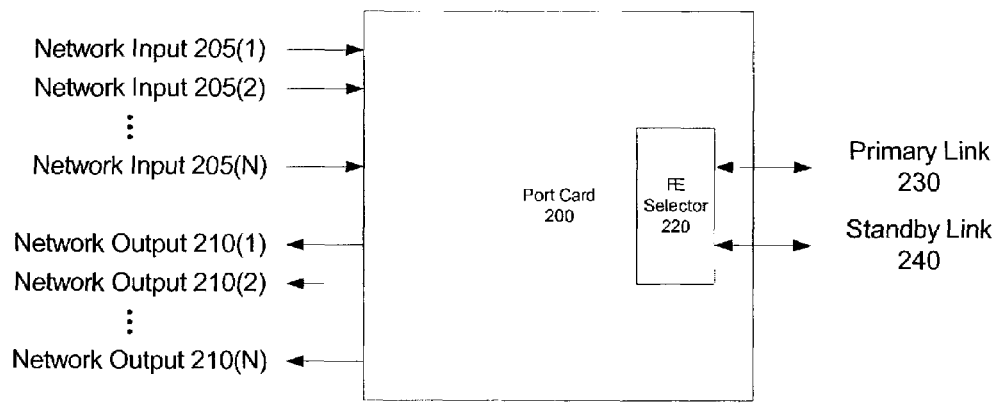
FIG. 2A is a block diagram illustrating a port card according to embodiments of the present invention.

FIG. 2A is a block diagram of a port card 200. Port card 200 is representative of one of port cards 110(1)-(N) of FIG. 1. Port card 200, as its name implies, supports a number of inbound and outbound ports that provide connectivity to the network elements whose data streams are to be switched. These connections are depicted in FIG. 2A as network inputs 205(1)-(N) and network outputs 210(1)-(N). Port card 200 also includes a forwarding engine selector (depicted as forwarding engine (FE) selector 220). FE selector 220 is coupled to both a primary forwarding engine (not shown) and a standby FE (also not shown). In the normal circumstance, selector 220 couples port card 200 to its primary forwarding engine via primary link 230. If the primary forwarding engine fails, selector 220 couples port card 200 to its standby forwarding engine via a standby link 240. Connections to primary forwarding engines are shown in FIG. 1 by solid lines between ones of port cards 110(1)-(N) and forwarding engines 120(1)-(N). Similarly, connections between a port card and its standby forwarding engine is shown in FIG. 1 by dashed lines between ones of port cards 110(1)-(N) and forwarding engines 120(1)-(N+1).

Figure 2B:
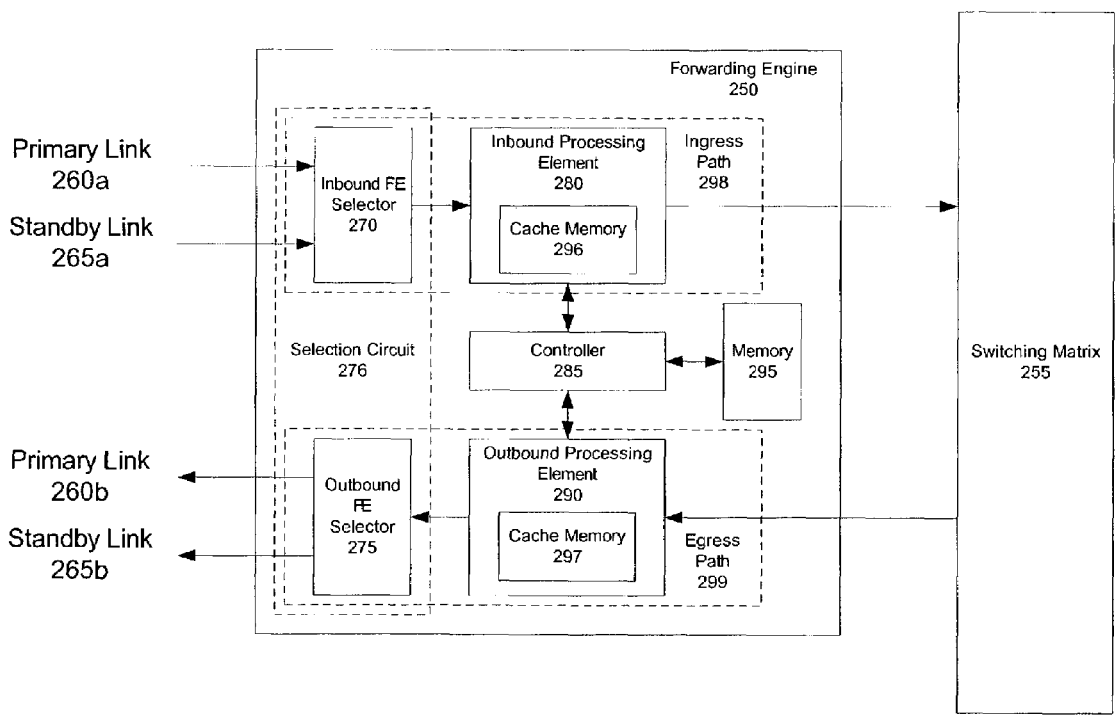
FIG. 2B is a block diagram illustrating a forwarding engine according to embodiments of the present invention.

FIG. 2B is a block diagram illustrating an example of a forwarding engine (depicted as a forwarding engine 250). Forwarding engine 250 is representative of one of forwarding engines 120(1)-(N+1) of FIG. 1. Forwarding engine 250 controls the forwarding of the information carried by a data stream received by a port card coupled to forwarding engine 250 as that information is passed to a switching matrix 255. As will be apparent, switching matrix 255 is exemplary of switching matrix 140. Forwarding engine 250 receives such data streams as a primary forwarding engine via a primary link 260a and transmits data streams as a primary forwarding engine via a primary link 260b. Similarly, forwarding engine 250 receives data streams as a standby forwarding engine via a standby link 265a and transmits data streams as a standby forwarding engine via a standby link 265b. The receiving and transmitting portions of the primary and standby links are depicted in FIG. 2B as such to allow for the description of the architecture of forwarding engine 250 in greater detail. Selection between primary links 260a and 260b, and standby links 265a and 265b is performed by an inbound FE selector 270 and an outbound FE selector 275, respectively (collectively referred to as a selection unit 276). Inbound FE selector 270 provides the data stream from the selected link to an inbound processing element 280. Inbound processing element 280 then forwards this data stream to switching matrix 255 under the control of a forwarding controller 285.

Conversely, a data stream received from switching matrix 255 is processed by an outbound processing element 290. Outbound processing element 290, under the control of forwarding controller 285, passes this data stream to outbound FE selector 275, which, in turn, passes the data stream back to the intended port card over either primary link 260b or standby link 265b. While forwarding controller 285 includes a certain amount of memory (e.g., on-chip or cache memory) additional memory is often required (e.g., for the storage of additional configuration information). This additional memory is depicted in FIG. 2B as a main memory (or more simply, memory) 295, which is coupled to forwarding controller 285 and may be, for example, DRAM memory. Storage of configuration information may also be provided in inbound processing element 280 and outbound processing element 290, as depicted in FIG. 2B by a cache memory 296 and a cache memory 297, respectively.

As depicted in FIG. 2B, forwarding engine 250 can be divided into an ingress path 298 and an egress path 299, among other components. Ingress path 298, which is also referred to herein as an inbound path, includes inbound FE selector 270 and inbound processing element 280. Egress path 299, similarly, includes outbound processing element 290 and outbound FE selector 275. Egress path 299 is also referred to herein as an outbound path. As is discussed elsewhere herein, a feature of ingress path 298 and egress path 299 are their ability to be switched independently, as exemplified by the fact that inbound FE selector 270 and outbound FE selector 275 are depicted as being separate units (although physically, inbound FE selector 270 and outbound FE selector 275 may be included in a single switching unit (e.g., controlled using the same control lines)). Controller 285 is designed with this in mind, and so is capable of switching the two paths independently (e.g., under software, firmware or hardware control), as is also discussed elsewhere herein.

Storage of configuration information (e.g., forwarding entries for each source/destination pair that are used to forward packets to their intended destination) is critical to the operation of such network elements. Configuration information use by an FE when the FE is acting as a primary FE is referred to herein as primary configuration information, while configuration information use by an FE when the FE is acting as a standby FE is referred to herein as standby configuration information. Thus, ready access to such information is, by implication, critical to its proper operation. This access is fostered by storing the requisite information in the fastest memory that is economically feasible. If such configuration information is not readily accessible, the result can be lost packets, and so, a failure in the effort to provide users with a high-availability network element.

There being a number of locations at which FE configuration information can be stored, design tradeoffs must be addressed. The decision regarding where this information is stored is affected by a number of factors. Such factors include the time involved in accessing and storing the information, the effect that such a delay has on the seamless operation of the switch in the event of a failure, the size and cost of memory space at each possible location (typically, the farther away from the datapath the memory is located, the larger and less expensive the memory), integrated circuit (IC) area available for use as cache memory, and other such considerations. For example, if the configuration information (both primary and standby FE configurations) can be stored in cache memories 296 and 297 (faster, but typically smaller and more expensive), that will be preferable to storing that information in memory 295 (slower, but larger and less expensive). Such information can also be downloaded from the switch's route processor. This tradeoff will impact the manner in which the configuration information is stored and retrieved, thus affecting the manner in which FEs take over for one another.

Thus, if the information for both primary and standby FEs (primary and standby configuration information, respectively) can all be stored in cache memories 296 and 297, switchover will be relatively fast, though the solution will likely be more expensive (both in terms of cost and areal requirements within the IC(s)). Conversely, if the information for both primary and standby FEs is stored in memory 295, switchover can be relatively slow, though the solution will likely be less expensive. If cache memories 296 and 297 are not large enough to hold all the necessary information (i.e., can only store one set of configuration information (e.g., primary configuration information)), this may oblige the designer to construct the switch so that, in the event of a failure, standby configuration information is copied from the forwarding controller's memory, or even from one FE to another (in the manner previously described).

It should also be noted that the designer may choose to strike a balance between speed and efficient use of resources by designing cache memories 296 and 297 to be of a size just large enough to allow them to store the configuration for only one set of configuration information (e.g., the primary FE configuration). The standby FE configuration is then stored in memory 295. This has the benefits of minimizing cost (by keeping expensive on-chip cache memory to a minimum) and using IC area efficiently, while minimizing control message traffic by storing the standby information locally (as well as improving the speed with which such information can be made available, as a result of the comparatively high-speed transfer available between memory 295, and cache memories 296 and 297).

In addressing the more general case of an N:M redundancy scheme, the more possible standby FEs, the more configurations must be stored, thereby requiring increased memory space, as well as the need for multiple standby links between port card and FEs. This, in turn, makes the option of storing such information in cache less practical (or even impossible), and likely more expensive. Such considerations provide motivation for the use of the simpler (and less expensive) N+1 redundancy scheme, as less memory is required because only the information required to support the two FEs need be stored. The demand for memory space can be reduced further, however, if there is significant duplication in the two configurations, as noted below.

The information thus stored/copied may not need to be the full complement of configuration information, but only the information that differs from one FE to another. This can make possible the storage of such information closer to the datapath (e.g., in cache memories 296 and 297, or at least in memory 295). This technique may be particularly attractive in the case where L>1 (or L>>), in which the reduction in memory requirements can make possible an otherwise unfeasible arrangement.

One optimization recognizes that the $(N+1)^{th}$ FE (also referred to herein as the standby FE) need only be loaded with the configuration information for the $N^{th}$ FE, and the first FE only loaded with the configuration information for that FE, if the architecture depicted in FIG. 1 is used. This is because these two FEs are only ever used in the one capacity (standby and primary FE, respective). Thus, only the other affected FEs need copy their information from one to another. It will be noted that, in the alternative, a simultaneous switching technique may be employed, in which some or all configuration information is stored within each FE.

It should be further noted that such techniques need not be used exclusively. Depending on the situation, a combination of simultaneous switchover and cascading switchover can be used. For example, the FEs closer to the failure may switchover using the cascading technique, and those farther away from the failed FE can use the simultaneous technique (having been given time to prepare for the transition by the time required for the minimal cascading transition performed). Alternatively, groups of FEs can be configured to switchover simultaneously.

Other alternative architectures or combinations thereof, can be employed in a network element capable of employing a technique according to the present invention. For example, one such embodiment reduces the average latency time required to switch to one or more standby forwarding engines in the case of a failure of a primary forwarding engine by situating the standby FE in the "middle" of the FEs. In such a configuration, a standby forwarding engine, while structurally no different from the other forwarding engines in the network element, is coupled to two port cards as a standby forwarding engine, and so is able to act as a standby forwarding engine for either of these port cards by their selecting the appropriate standby link. In this architecture, the switchover involves only the failed FE, the standby FE, and the FEs between the two. By allowing the network elements' affected port cards to select respective ones of the forwarding engines as standby forwarding engines, including the standby forwarding engine, this architecture simplifies and speeds switchover by reducing the number of FEs involved in the switchover operation.

Alternatively, a round-robin approach may be employed. The standby forwarding engine (e.g., forwarding engine 120 (N+1) of FIG. 1) can be coupled to both the first and last port cards (e.g., port card 110(N), as shown, and port card 110(1), respectively). In that case, each of port cards 110(1)-(N) are coupled to three forwarding engines, a primary forwarding engine, a standby forwarding engine in the "clockwise" direction, and a standby forwarding engine in the "counter-clockwise" direction. Thus, depending on the location of the failure, the switchover will involve the smallest number of FEs (i.e., the restoration involves the FEs along the shortest route between the failed FE and standby FE (i.e., the direction that involves switching over the fewest number of forwarding engines)). This can, in effect, put the standby FE in the "middle," as the standby FE is equidistant from the most distant FEs (assuming the network element is fully populated with port cards/FEs).

Moreover, any of the preceding architectures can be employed in a "grouped" architecture. Using such an architecture, the basic architecture (or some variant thereof) is partitioned into groups. Supporting each of these groups is a standby forwarding engine. When a failure occurs in one of the forwarding engines of a given group, appropriate standby links are selected by the appropriate port cards, forwarding engines, and standby forwarding engine of the group, restoring the failure. In this manner, a failure in one of the group's forwarding engines is properly managed, while leaving the other group(s) undisturbed. In simple terms, latency times are reduced and mean-time between failure is improved by the addition of standby forwarding engines, which in turn allow the division of port cards and forwarding engines into groups. Each of these groups operates in a manner similar to that of the group's basic architecture, albeit with fewer port cards and forwarding engines, and so fewer switchovers to perform in any given situation.

The architectures and alternatives discussed above are described in further detail in the patent application entitled "METHOD AND SYSTEM FOR PROVIDING REDUNDANCY WITHIN A NETWORK ELEMENT," as previously included by reference herein.

A Basic Example of Forwarding Engine Switchover

Figure 3:
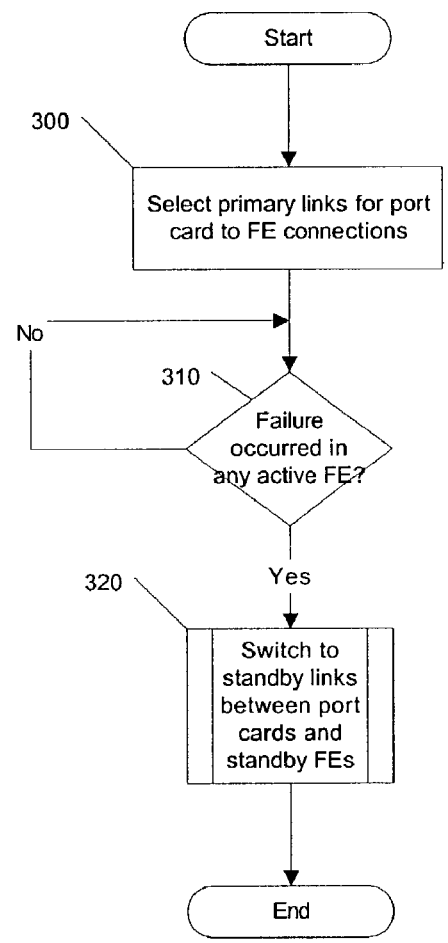
FIG. 3 is a flow diagram illustrating actions performed by a process according to an embodiment of the present invention.

FIG. 3 is a flow diagram that illustrates, generally, the actions performed by a process according to a network element (e.g., a network element such as switch 100) in implementing an embodiment of the present invention. The process begins with the selection of primary links by the port cards and forwarding engines to provide connectivity between these elements (step 300). Once the primary links have been selected, the switch's route processor awaits the indication of a failure in one of the active forwarding engines (step 310). While no such failures occur, the process simply loops. In the event of such a failure, one or more of the standby links are selected by the affected port cards and forwarding engines. This switchover can be effected in any one of a number of ways. For example, switching for all such affected links can be performed simultaneously under the control of the switch's route processor, as is depicted in FIG. 3, although a cascading technique or other technique can be used. However, as noted, approaches that employ cascading are typically significantly slower. In a simultaneous switchover process, the route processor causes the port card attached to the failed forwarding engine to switch over to its standby link, and the port card's standby forwarding engine to also switch to the standby link to support that port card (step 320). Also at about this time, other (affected) FEs are switched over. By performing the switchovers at (approximately) the same time, much of the machinations associated with switching over the affected FEs can be performed in parallel, saving time and making the switchover as seamless as possible. At this point, the failed forwarding engine, having been switched out of service, can now be replaced.

Thus, the route processor simply configures the affected port cards and forwarding engines to switch over to their corresponding standby forwarding engines/port cards, respectively, at (approximately) the same time. In this manner, the forwarding engines are configured to support the port card for which those forwarding engines are a standby, and so, preferably, store their standby configuration information in some readily accessible location, for quick availability in the event of a failure. However, this means that each forwarding engine needs to support the storage of such configuration information (both the primary and standby connections) in some manner, so that the switchover can be accomplished without the relatively long delay involved in copying configuration information from one forwarding engine to another.

As noted, FIG. 3 depicts a flow diagram illustrating a process according to one embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, and the like. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

It should be noted that, depending on the implementation, the transitions discussed in connection with FIG. 3 may result in two port cards being coupled to the same FE for a short period of time. If this can occur in the given design, the FEs should be designed to accept data streams from multiple port cards, and to correctly forward this information. As will be evident, the FEs in such a system should also be designed to be coupled to multiple links at the same time. Conversely, the port cards of such a system must be able to receive data streams through both their primary and standby links. Such capabilities ensure that data is not lost during such transitions.

It should also be noted that, whatever the method for providing programming to an FE when implementing an embodiment of the present invention, the switchover to the standby FE should be stateful (i.e., maintain information regarding the state of the failed FE so as to allow the data streams switched thereby to proceed as if no failure had occurred). As noted, this can be done by pre-programming all the necessary information into each FE, by copying information from one FE to another, or by some other method (e.g., by downloading such information from the switch's route processor). This is an important feature, because it supports such a switch's ability to maintain the data streams being switched in the face of an FE failure.

Alternative Switchover Techniques

In the network element architectures discussed herein, various techniques can be employed to switch over forwarding engines. These methods include the following.

1) One method is referred to herein as a "simultaneous switchover" method, in which each FE stores complete configuration for all possible configurations that might be needed in a switchover situation (e.g., a primary and standby configuration). However, this method is only applicable to configurations in which all forwarding engines are, for example, of the double configuration type.

2) Another method, referred to herein as a "cascading switchover" method, is applicable to any type of forwarding engine. However, such a method does not accomplish the switchover and restoral to service of FEs in an optimal amount of time, as the switchover must cascade through the FEs/port cards, as noted previously.

3) Yet another method, referred to herein as a "modified simultaneous switchover," can also be employed, but is not without its own limitations. While such a method is applicable to any forwarding engine configuration, this method forces the switchover of all forwarding engines in a lockstep manner. Therefore, while simple with regard to control, such an approach penalizes the restoral-to-service time of forwarding engines that provide double configuration, in order to wait for the switchover of single configuration forwarding engines.

4) The "group-based" switchover, in a manner similar to that discussed previously, divides the set of forwarding engines into two groups, those forwarding engines with double configuration and those with single configuration, and performs the switchover of each group in lockstep. While this method improves the restoral-to-service time of the double configuration forwarding engines, the method still constrains the single configuration forwarding engines into a single group, and members of this single configuration group can still have very different switchover times as a result of the varying amounts of information that may be stored in their hardware tables. Additionally, in practice, double configuration FEs are not the rule, but the exception. In fact, while one can employ a double configuration FE in the ingress path, design constraints may mandate the use of a single configuration FE on the outgoing path.

Thus, while the above methods can provide acceptable performance in the event of a failure and subsequent switchover, it is desirable to provide improved performance in such situations, if possible. The technique described below provides such improved performance.

An Example of an Optimized Switchover Technique

A method and system according to the present invention provide a design for the FE switchover problem that treats each forwarding engine individually, managing the switchover and restoring the forwarding engine to service as soon as the copying of the appropriate information is completed, without the need to wait for a group of forwarding engines to complete their switchover. Because of the approach employed, the method is referred to herein as an "individual-based switchover" method.

This "individual-based switchover" method is also extensible. In one embodiment, this method decouples the switchover of the given FE's incoming path from the switchover of that FE's outgoing path. Such a method allows the incoming forwarding path of the given forwarding engine to return to service, while the FE's outgoing path is still undergoing the switchover. This allows the incoming path of the given forwarding engine to forward packets to other forwarding engines whose outgoing paths have already completed the switchover, or which were not involved in the switchover. Thus, the restoral-to-service time from the forwarding engine's switchover is minimized.

Using the network element architecture described previously as an example, it can be seen that a route processor (RP) can be made responsible for coordinating the switchover of affected FEs. As noted, a switchover scheme according to embodiments of the present invention minimizes switchover time and restoration of service by allowing the FEs to perform most, if not all, of the switchover operations in parallel, thus eliminating sequential operations that would be expected to increase the time required for switchover.

In this scheme, each FE goes through the switchover individually. Each FE then returns to service as soon as any FE (including itself) is ready to send traffic to that FE. As slower FEs (i.e., FEs which take longer to indicate their ability to send traffic) prepare to send traffic to the given FE, the slower FEs are enabled to send traffic (i.e., the flow control from this FE to the one that just became ready to send traffic is removed).

A given FE may require a different amount of time to switchover based upon its current configuration. For example, three different configurations that can cause differences in the amount of time necessary to switchover include: 1) an FE with single configuration (stored in cache memory), 2) an FE with incoming FE (IFE) double configuration and outgoing FE (OFE) single configuration, and 3) an FE with double configuration. Each of these configurations differs in the amount of time necessary to switchover because of the need (or lack of need) to copy configuration information from the FE's main memory to the ingress and/or egress path's cache memory.

In a single configuration, the given path within the FE supports cache memory containing only the active configuration. The standby configuration is stored in main memory. This architecture therefore requires complete reprogramming of the given path's hardware, and so, typically requires the most time. An FE with IFE double configuration and OFE single configuration is a hybrid solution, in that the ingress path tables have both active and standby configurations programmed therein, while the egress path tables have only the active configuration programmed therein. As such, a switchover requires only the reprogramming of the egress path tables. As a result, this architecture requires less time to reprogram than the single configuration, but more time than that required by a double configuration. Finally, the FE supporting double configuration takes relatively little time to switchover, due to the fact that the path's hardware tables already have both active and standby configurations loaded.

To accommodate these varying amounts of time required for switchover, a method according to the present invention makes each switchover as independent (from that of other FEs) as possible, without forcing one FE to wait for the completion of a task by another FE. This allows each FE to switchover as quickly as the FE is capable of switching over, while minimizing the amount of time the system is affected by the switchover operations.

An optimization to this approach allows for yet faster restoration of service by decoupling the switchover of the ingress forwarding engine (IFE) and outgoing forwarding engine (OFE). Thus, when the IFE has reprogrammed its tables (if any such reprogramming is required), ingress traffic is once again allowed to flow, without having to wait for the OFE. This allows packets from the IFE to reach the OFE of FEs which are not directly involved in the switchover, or that are directly involved in the switchover, but have already completed their switchover.

Basic FE switchover

Figure 4:
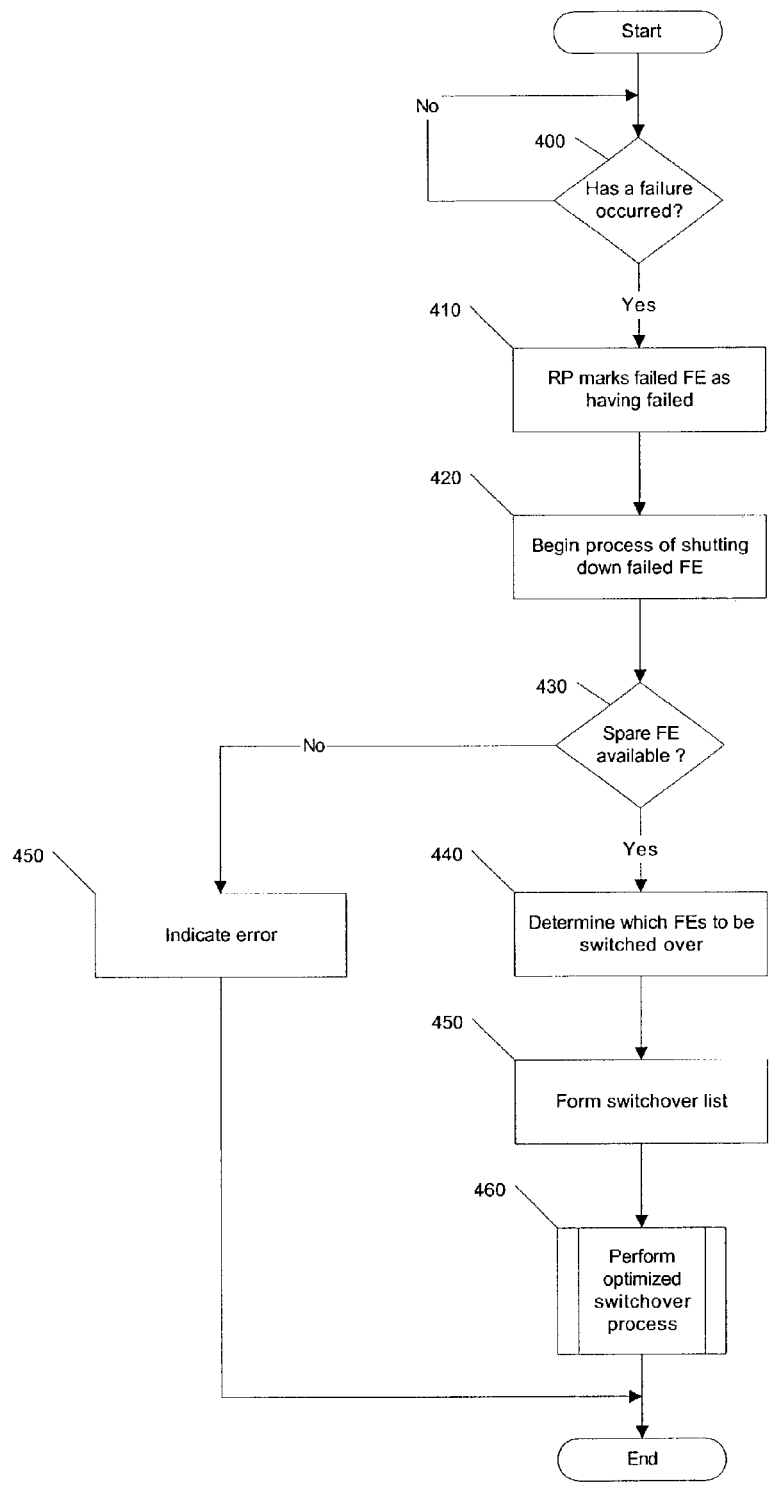
FIG. 4 is a flowchart illustrating an example of a basic forwarding engine switchover process according to the present invention.

FIG. 4 is a flowchart illustrating an example of a basic FE switchover process. First, the network element's RP learns of an FE failure (step 400), and, as a result, marks that FE as FAILED (step 410) and starts the process of shutting down the failed FE (step 420). It should be noted that, typically, a software entity in the RP (e.g., system diagnostics or management software) will later attempt to restore the FE in any one of a number of ways (e.g., cycling power to the FE, reloading the FE, or other such techniques) in an attempt to determine if the FE can be recovered without further hardware intervention.

Next, the RP determines if there is an appropriate spare FE available (step 430). It should be noted that, while a spare FE might exist within the network element, the spare FE might not be in a chassis position that is of use for this particular failure condition. If a spare FE (for the current redundancy domain) can be found (step 430), the RP makes a determination as to which FEs will be directly involved in the switchover (step 440). Typically, all the FEs that lie between the failed FE and the spare FE inclusive are directly involved in the switchover. A switchover list is formed (step 450), and the process now described is initiated (step 460). Otherwise, the failure is not recoverable, and the error is indicated to a system operator (step 470).

An Example Optimized FE Switchover Process

Prior to discussing the example switchover process, the terminology used in its description should be reviewed. A message MESSAGE_1 sent from RP to FE#x is referred to as MESSAGE_1(x). A message MESSAGE_2 sent from RP to FE#x, in regards to some operation related to FE#y, is referred to as MESSAGE_2(x,y). A message MESSAGE_3 sent from FE#x to RP is referred to as MESSAGE_3(x), while a message MESSAGE_4 sent from FE#x to RP, in regards to some operation related to FE#y, is referred to as MESSAGE_4(x,y).

Figure 5A:
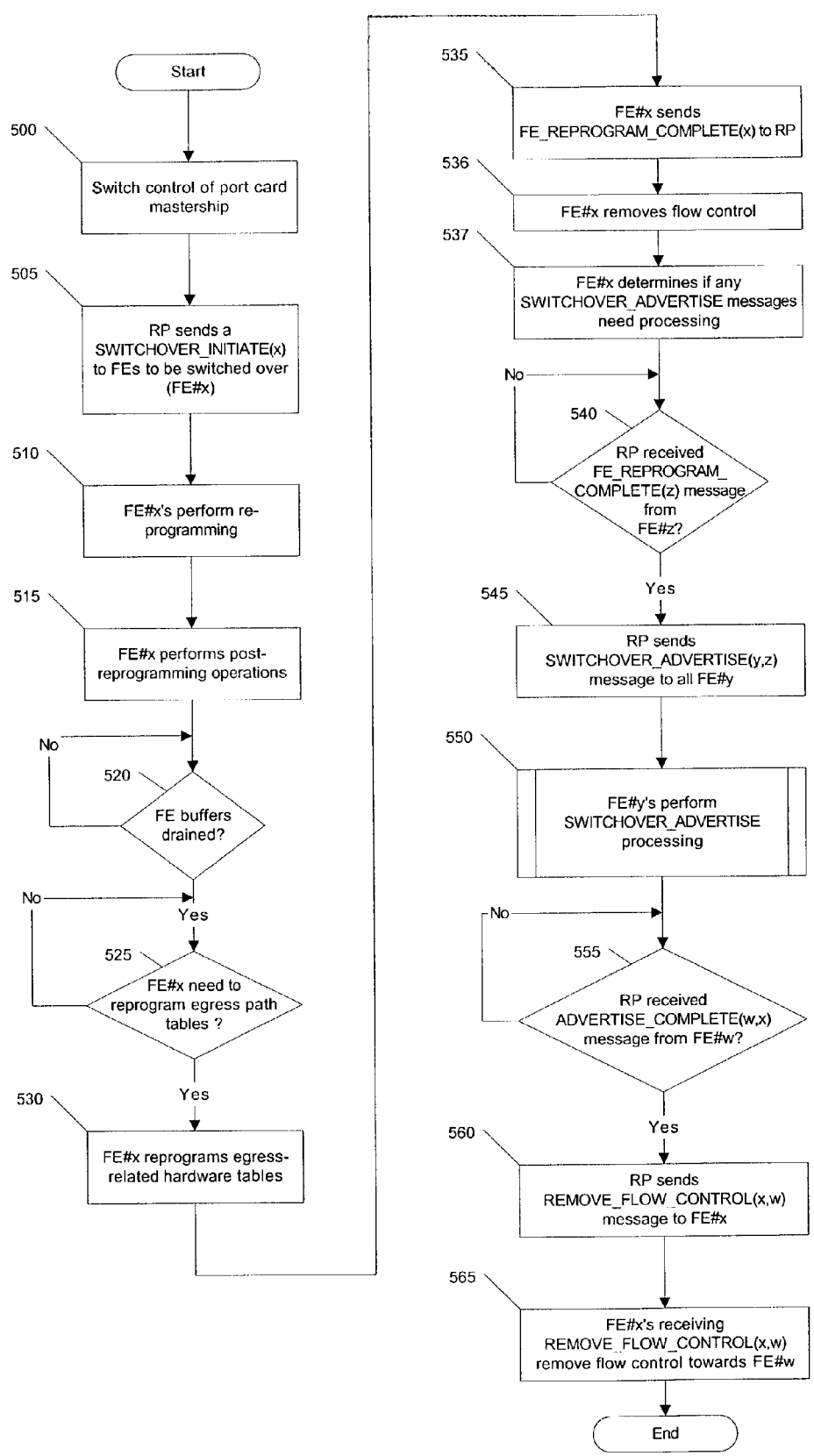
FIGS. 5A and 5B are flow diagrams illustrating an example optimized forwarding engine switchover process according to the present invention.
Figure 5B:
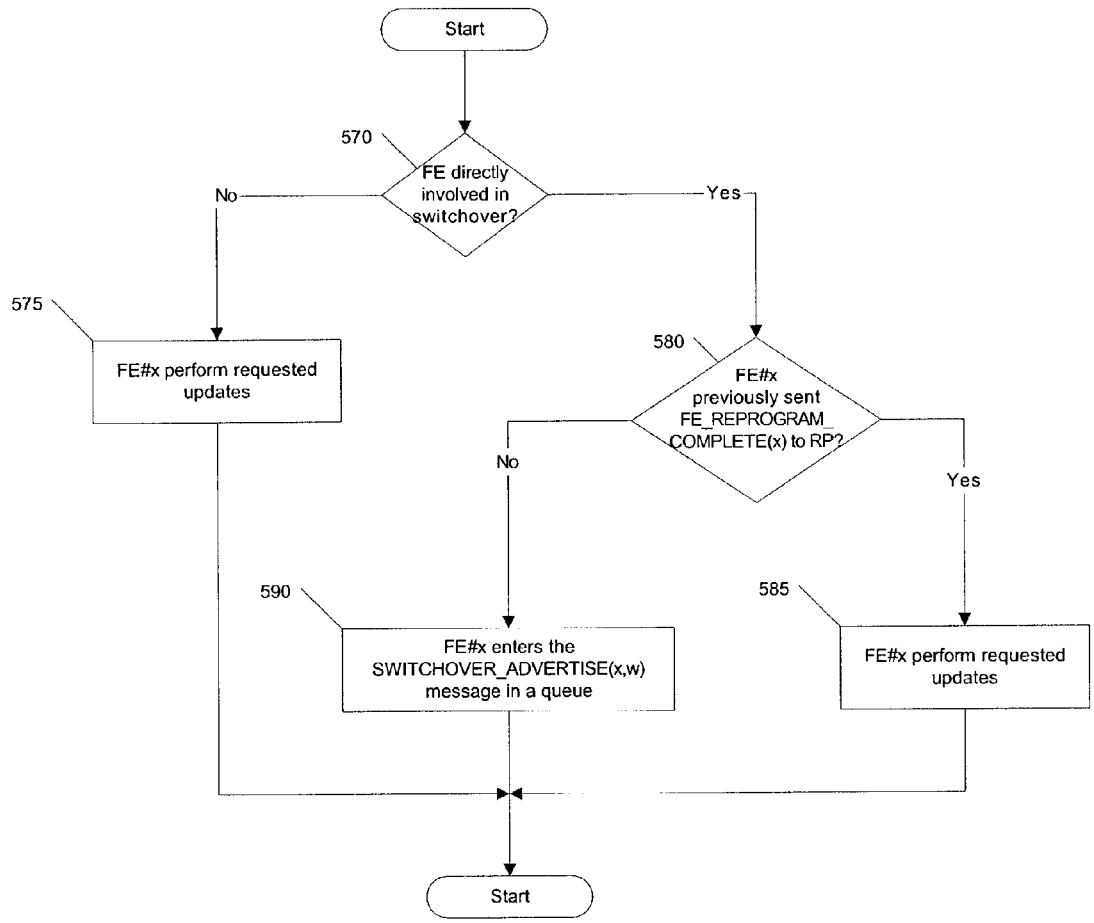

FIGS. 5A and 5B are flow diagrams illustrating an example optimized FE switchover process according to the present invention. Such a process can, for example, be constructed as follows.

1) The RP switches control of port card mastership using its bus to the port cards (step 500). Mastership is changed from the active FE to the standby FE. This allows the standby FE to control the link to the port card.

2) The RP sends a SWITCHOVER_INITIATE(x) command to all FE#x directly involved in the switchover (i.e., those FEs "between" the failed FE (the FE to be replaced) and the spare FE, inclusive) (step 505). The RP also starts an overall switchover timer (TIMER(x, Ts)), of duration T seconds, to monitor for the eventual reception of a message referred to herein as an FE_REPROGRAM_COMPLETE(x) message from FE#x. (If TIMER(x, Ts) expires, an error condition is indicated and handled appropriately.)

3) Upon receiving the SWITCHOVER_INITIATE(x) command, FE#x performs the following operations (step 510):

a) stop ingress traffic (It should be noted that stopping ingress traffic avoids concurrent access to hardware tables by the forwarding hardware (in attempting to forward packets) and the CPU (attempting to reprogram those same tables), therefore speeding reprogramming);
   b) perform processing related to the FE ingress path (e.g., allowing ingress buffer to drain, reading ingress statistics, and so on);
   c) reprogram the ingress-related hardware tables (if any such reprogramming is necessary); and
   d) flush any left-over ingress buffers (if desired/necessary), and allow output buffers to drain.

It will be noted that the FE's controller programs the ingress-related hardware tables using the standby configuration already in the FE controller's main memory. It may be the case that a particular FE can store both the active and standby configuration in the ingress path's cache memory. If that is the case, no actual programming of the hardware tables is necessary.

4) Once the reprogramming of the ingress-related hardware tables is completed (it should be noted that, in a double configuration FE, the reprogramming conceptually takes no time), FE#x performs the following operations (step 515):

a) request flow control of all unicast and multicast flows from other FEs and RP data path to FE#x;
   b) perform processing related to the FE egress path (e.g., flushing outgoing path buffers); and
   c) switch the links from the port card feeding into FE#x, to the one from the new port card that will be connected to FE#x.

At this point, ingress traffic from the new port card connected to FE#x starts being processed and forwarded to all FEs that have not flow-controlled FE#x. Traffic for those FEs which have not yet finalized their switchover will accumulate in the proper per port/per priority buffer queues, and will eventually be allowed to flow again once their respective FEs complete their switchover and remove their flow control towards FE#x.

5) FE#x then waits for its outgoing buffers to drain (step 520), at which point FE#x starts reprogramming the egress-related hardware tables (if any such reprogramming is necessary), among other potential operations (steps 525 and 530).

6) When the reprogramming of the egress-related hardware tables is completed (in a double configuration FE, the reprogramming conceptually takes no time), FE#x sends FE_REPROGRAM_COMPLETE(x) to the RP, removes flow control for both unicast and multicast from the RPs (steps 535, 536 and 537), and starts checking to determine if there are any SWITCHOVER_ADVERTISE messages to process (step 540).

7) Once the RP receives a FE_REPROGRAM_COMPLETE(z) message from FE#z (step 540), the RP sends a SWITCHOVER_ADVERTISE(y,z) message to all FE#y in the system (i.e., all FE directly involved in the switchover as well as all FEs not directly involved in the switchover) (step 545). In this SWITCHOVER_ADVERTISE(y,z) message, the RP requests:

a) update of the "switch fabric port mapping table" entry related to the FE that FE#z will be replacing (i.e., asking that the "switch fabric port mapping table" entry corresponding to either FE#(z−1) or FE#(z+1), as may be the case, be updated with the switch port fabric of FE#z); and
   b) update, in the hardware tables, of all multicast entries which are affected as a result of the switchover.

For example, if the RP receives an FE_REPROGRAM_COMPLETE(3) message from FE#3, it sends a SWITCHOVER_ADVERTISE(y,3) message to all FE#y, requesting update of tables (in particular the "switch fabric port mapping table" for FE#2, if FE#3 will be taking over for FE#2; and the multicast entries that specify one of the FEs directly involved in the switchover). Likewise, when the RP receives a FE_REPROGRAM_COMPLETE(4) message from FE#4, the RP sends a SWITCHOVER_ADVERTISE(y,4) message to all FE#y, requesting update of tables (in particular the "switch fabric port mapping table" for FE#3, if FE#4 will be taking over for FE#3; and the multicast entries that specify one of the FEs directly involved in the switchover).

8) Whenever an FE#x receives a SWITCHOVER_ADVERTISE(x,w) message, FE#x performs certain actions (step 550)

FIG. 5 B is a flow diagram illustrating these actions:

a) If FE#x is an FE which is not directly involved in the switchover (i.e., an FE which has not received a SWITCHOVER_INITIATE(x) message) (step 570), FE#x performs the requested updates immediately (step 575);

b) If FE#x is an FE that is directly involved in the switchover (i.e., an FE that has received a SWITCHOVER_INITIATE(x) message) (step 570) and FE#x has previously sent the FE_REPROGRAM_COMPLETE(x) message to the RP (step 580), FE#x performs the requested updates immediately (step 585).

c) If FE#x is an FE that is directly involved in the switchover (i.e., an FE that has received a SWITCHOVER_INITIATE(x) message) (step 570) and FE#x has not yet sent the FE_REPROGRAM_COMPLETE(x) message (e.g., a FE which is member of the single configuration group, and therefore will take longer to switch over, due to the time involved in actually reprogramming of hardware tables) (step 580), then FE#x simply enters the SWITCHOVER_ADVERTISE(x,w) message in a queue (step 590), for later processing (after FE#x eventually sends its FE_REPROGRAM_COMPLETE(x) message).

It should be noted that the updates to be made by FE#x typically include the following. First, FE#x updates the "switch fabric port mapping table" entry for the FE parameter indicated in the message (i.e., either FE#(w−1) or FE#(w+1), as may be the case) to FE#w. In essence, the entry whose address is the switch fabric port for FE#(w−1), in case the FE parameter was (w−1), is now updated to contain the value of the switch fabric port for FE#w. Second, if this is the first SWITCHOVER_ADVERTISE(x,w) message processed for any FE#w, FE#x updates the multicast entries which involve any of the FEs directly involved in the switchover, as indicated in the parameters of the message.

9) As an FE#x finishes the updates requested by the SWITCHOVER_ADVERTISE(x,w) message, the FE#x replies to the RP with an ADVERTISE_COMPLETED(x,w) message. As an example, an ADVERTISE_COMPLETED(7, 3) is sent by FE#7 to the RP indicating that this message came from FE#7 and that the updates requested by the RP related to FE#3 have been completed.

10) For each ADVERTISE_COMPLETE(w,x) message received by the RP from FE#w indicating that the updates related to FE#x have been completed (step 555), the RP sends a REMOVE_FLOW_CONTROL(x,w) message to FE#x (step 560), requesting that the flow control of FE#w be removed.

11) When an FE#x receives a REMOVE_FLOW_CONTROL(x,w) message requesting that flow control of FE#w be removed, FE#x removes the forced unicast and multicast flow control towards FE#w (step 565).

As a result, traffic from FE#w destined for FE#x starts being processed by FE#x again, and as each of the other FE completes their switchover (if they were FEs directly involved in the switchover), or as they simply update the entries in their table (if they were FEs not directly involved in the switchover), traffic from those FEs resumes being processed on the outgoing forwarding engine (OFE) of FE#x.

Figure 6:
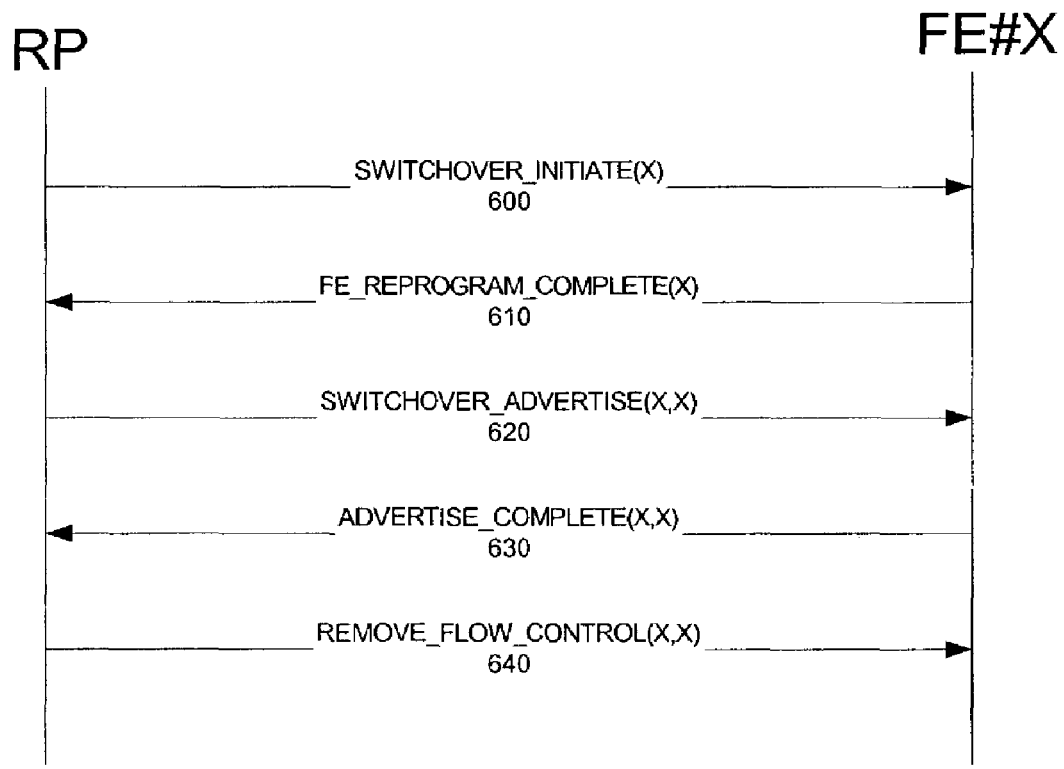
FIG. 6 is a diagram illustrating the basic switchover protocol between the route processor and a single forwarding engine that is undergoing switchover.

FIG. 6 is a diagram illustrating the basic switchover protocol between the RP and a single FE that is undergoing switchover. As described in greater detail previously, the RP first sends the FE a SWITCHOVER_INITIATE(X) message 600 to initiate the switchover operation in the FE. The FE responds with an FE_REPROGRAM_COMPLETE(X) message 610, once the FE's reprogramming is complete. The RP then sends out a SWITCHOVER_ADVERTISE(X,X) message 620, in order to request the FE to update various hardware configuration information. The FE then sends an ADVERTISE_COMPLETE(X,X) message 630, once the FE is finished making the updates requested by the RP. The RP then sends a REMOVE_FLOW_CONTROL(X,X) message 640, in order to request removal of flow control between the FE and other FEs in the system.

It should be noted that when there are multiple FEs in the chassis, "SWITCHOVER ADVERTISE" messages are sent by the RP to all FEs, ultimately soliciting an "ADVERTISE COMPLETE" response from each FE. Upon receiving the "ADVERTISE COMPLETE" response, the RP will send the FE that has just switched over a "REMOVE FLOW CONTROL" message for each FE that has responded with "ADVERTISE COMPLETE". Much of the complexity associated with multiple FEs is therefore eliminated from this diagram in order to show the basic protocol.

Figure 7:
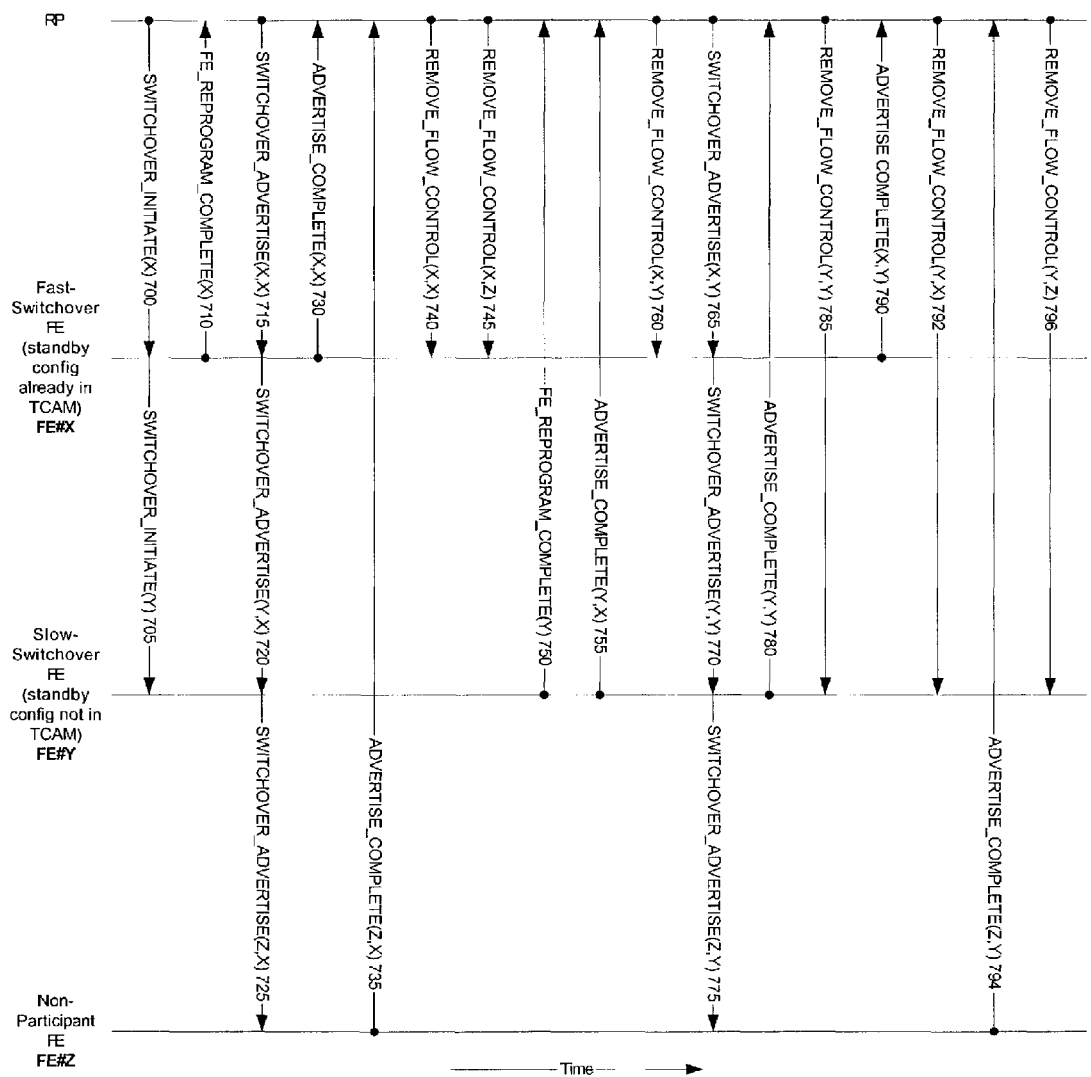
FIG. 7 is a diagram illustrating the interactions between an route processor and forwarding engines having various response times.

FIG. 7 is a diagram illustrating the interactions between an RP and three different FEs: one FE which is slow to switchover because the FE is a single configuration FE (referred to as FE#X), another FE which is fast to switchover because the FE has a double configuration (referred to as FE#Y), and another FE which is a non-participating FE (referred to as FE#Z). This diagram is an aid to understand how each switchover is communicated to the other FEs via the "SWITCHOVER ADVERTISE" message. FIG. 7 also shows the manner in which a "fast switchover" FE completes its switchover before a "slow switchover" FE completes its switchover. Each FE is, in effect, switching over independently of the others, while keeping the other FEs informed of its progress. The dotted end of each line representing a message in FIG. 7 represents the originator of the message. The arrowed end of each line representing a message in FIG. 7 represents the receiver of the message.

The process begins with the RP sending a SWITCHOVER_INITIATE(X) message 700 to FE#X and a SWITCHOVER_INITIATE(Y) message 705 to FE#Y. FE#Z is not sent such a message, as it is not participating in this switchover. Once the reprogramming of the ingress-related hardware tables is completed (which occurs more quickly for FE#X than for FE#Y), FE#X responds with an FE_REPROGRAM_COMPLETE(X) message 710. The RP then sends a SWITCHOVER_ADVERTISE(X,X) message 715 to FE#X, a SWITCHOVER_ADVERTISE(Y,X) message 720 to FE#Y, and a SWITCHOVER_ADVERTISE(Z,X) message 725 to FE#Z, to notify the FEs of FE#X's having completed its switchover. FE#X then replies with an ADVERTISE_COMPLETE(X,X) message 730, indicating that FE#X has finished the updates requested by the RP. FE#Z then replies with an ADVERTISE_COMPLETE(Z,X) message 735, indicating that FE#Z has also finished the updates requested by the RP. FE#X and FE#Z having completed these updates, the RP now sends a REMOVE FLOW_CONTROL(X,X) message 740 to FE#X and a REMOVE_FLOW_CONTROL(X,Z) message 745 to FE#Z, in order to remove flow control to FE#X from FE#X and FE#Z.

FE#Y now responds to the RP's having sent SWITCHOVER_INITIATE(Y) message 705 by sending an FE_REPROGRAM_COMPLETE(Y) message 750 to the RP, indicating that the reprogramming of the ingress-related hardware tables is completed for FE#Y. FE#Y also now responds to the SWITCHOVER_ADVERTISE(Y,X) message 720 sent by the RP, by sending the RP an ADVERTISE_COMPLETE(Y,X) message 755. The RP responds to this message with a REMOVE_FLOW_CONTROL(X,Y) message 760, indicating that FE#Y should remove flow control for FE#X. The RP also sends a SWITCHOVER_ADVERTISE(X,Y) message 765 to FE#X, a SWITCHOVER_ADVERTISE(Y,Y) message 770 FE#Y, and a SWITCHOVER_ADVERTISE(Z,Y) message 775 to FE#Z, indicating that the respective FE's should performs the requested updates. FE#Y responds with an ADVERTISE_COMPLETE(Y,Y) message 780, indicating that FE#Y has finished the requested updates. RP then responds with a REMOVE_FLOW_CONTROL(Y,Y) message 785, in order to cause FE#Y to remove flow control from its own flows. FE#X now responds to SWITCHOVER_ADVERTISE(X,Y) message 765 sent by the RP with an ADVERTISE COMPLETE(X,Y) message 790. The RP then indicates that FE#Y should remove flow control by sending FE#Y a REMOVE_FLOW_CONTROL(Y,X) message 792. FE#Z now responds to SWITCHOVER_ADVERTISE(Z,Y) message 775 sent by the RP, by sending the RP an ADVERTISE_COMPLETE(Z,Y) message 794. The RP responds by sending a REMOVE_FLOW_CONTROL(Y,Z) message 796 to FE#Y, to remove flow control.

Numerous advantages are provided by a method and system according to the present invention. A network element architecture employing such a method and system enjoys quick, efficient restoration of service in the case of a failed FE. Such an "individual-based switchover" technique accomplishes this by treating each forwarding engine individually, carrying on the switchover and restoring the network element to service as soon as the copying of the appropriate information is completed, without the need to wait for a group of forwarding engines to complete their respective switchovers. This individual-based switchover technique can also employ decoupling the incoming path's switchover from that of the outgoing path. Such a method allows the incoming forwarding path of the given forwarding engine to return to service, while the forwarding engine's outgoing path is still undergoing the switchover. This allows the forwarding engine's incoming path to forward packets to other forwarding engines (whose outgoing paths have already completed the switchover, or which were not involved in the switchover), reducing restoral-to-service time.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method comprising:
   receiving an indication that a forwarding engine should perform a switchover operation; and
   performing said switchover operation in response to said receiving said indication, wherein
      said switchover operation comprises switching a coupling of said forwarding engine between a first interface card and a second interface card,
      said switchover operation is performed independently of another switchover operation, and
      said another switchover operation is performed by another forwarding engine;
   receiving said indication that said forwarding engine has completed said switchover operation; and
   acknowledging said indication that said forwarding engine has completed said switchover operation.

2. The method of claim 1, wherein said performing said switchover operation comprises:
   reprogramming an ingress path of said forwarding engine; and
   reprogramming an egress path of said forwarding engine.

3. The method of claim 2, wherein said reprogramming said ingress path of said forwarding engine and said reprogramming said egress path of said forwarding engine are independent of one another.

4. A method comprising:
   receiving an indication that a forwarding engine should perform a switchover operation;
   performing said switchover operation in response to said receiving said indication, wherein
      said switchover operation comprises
         switching a coupling of said forwarding engine between a first interface card and a second interface card,
         said switchover operation is performed independently of another switchover operation, and
         said another switchover operation is performed by another forwarding engine;
   indicating that said forwarding engine has completed said switchover operation;
   receiving said indication that said forwarding engine has completed said switchover operation; and
   acknowledging said indication that said forwarding engine has completed said switchover operation.

5. The method of claim 4, wherein
   said forwarding engine is a one of a plurality of forwarding engines, and
   each of said forwarding engines receive said indication that said forwarding engine has completed said switchover operation.

6. The method of claim 5, further comprising:
   acknowledging that said forwarding engine has completed said switchover operation.

7. The method of claim 4, further comprising:
   acknowledging that said forwarding engine has completed said switchover operation.

8. The method of claim 7, further comprising:
   removing flow control between said forwarding engine and a forwarding engine performing said acknowledging.

9. The method of claim 8, wherein said removing said flow control is only performed after said forwarding engine performing said acknowledging performs said acknowledging.

10. A forwarding engine comprising:
    a processor;
    computer readable medium coupled to said processor; and
    computer code, encoded in said computer readable medium, configured to cause said processor to:
       receive an indication that said forwarding engine should perform a switchover operation;
       perform said switchover operation in response to said indication, wherein
          said computer code configured to cause said processor to perform said switchover operation is further configured to switch a coupling of said forwarding engine between a first interface card and a second interface card said switchover operation is performed independently of another switchover operation, and
said another switchover operation is performed by another forwarding engine;
indicate that said forwarding engine has completed said switchover operation;
receive said indication that said forwarding engine has completed said switchover operation; and
acknowledge said indication that said forwarding engine has completed said switchover operation.

11. The forwarding engine of claim 10, wherein said computer code configured to cause said processor to perform said switchover operation is further configured to cause said processor to:
reprogram an ingress path of said forwarding engine; and
reprogram an egress path of said forwarding engine.

12. The forwarding engine of claim 11, wherein said ingress path and said egress path are configured to be reprogrammed independently of one another.

13. The forwarding engine of claim 10, wherein
said forwarding engine is a one of a plurality of forwarding engines, and
each of said forwarding engines are configured to receive said indication that said forwarding engine has completed said switchover operation.

14. The forwarding engine of claim 10, wherein said computer code is further configured to cause said processor to:
remove flow control between said forwarding engine and a forwarding engine performing said acknowledging.

15. The forwarding engine of claim 14, wherein
said removing said flow control is only performed after said forwarding engine performing said acknowledging performs said acknowledging.

16. A computer program product having a computer readable storage medium with computer readable program code stored thereon configured to cause said computer to execute:
a first set of instructions, executable on a computer system, configured to receive an indication that said forwarding engine should perform a switchover operation;
a second set of instructions, executable on said computer system, configured to perform said switchover operation in response to said indication, wherein
said computer code configured to cause said processor to perform said switchover operation is further configured to switch a coupling of said forwarding engine between a first interface card and a second interface card,
said switchover operation is performed independently of another switchover operation,
said another switchover operation is performed by another forwarding engine, and
said second set of instructions comprises
a first subset of instructions, executable on said computer system, configured to reprogram an ingress path of said forwarding engine, and
a second subset of instructions, executable on said computer system, configured to reprogram an egress path of said forwarding engine;
a third set of instructions, executable on said computer system, configured to receive, at said another forwarding engine, an indication that said forwarding engine has completed a switchover operation; and
a fourth set of instructions, executable on said computer system, configured to cause said another forwarding engine to acknowledge said indication that said forwarding engine has completed a switchover operation in response to said receiving said indication that said forwarding engine has completed said switchover operation.

17. The computer program product of claim 16, wherein said ingress path and said egress path are configured to be reprogrammed independently of one another.

18. The computer program product of claim 16, further comprising:
a fifth set of instructions, executable on said computer system, configured to wherein said ingress path and said egress path are configured to be reprogrammed independently of one another.

19. The computer program product of claim 16, further comprising:
a fifth set of instructions, executable on said computer system, configured to remove flow control between said forwarding engine and a forwarding engine performing said acknowledging.

20. The computer program product of claim 16, further comprising:
a fifth set of instructions, executable on said computer system, configured to said removing said flow control is only performed after said forwarding engine performing said acknowledging performs said acknowledging.

21. A computer program product comprising:
a computer readable storage medium with computer readable program code stored thereon configured to cause said computer to execute
a first set of instructions, executable on a computer system, configured to receive an indication that said forwarding engine should perform a switchover operation;
a second set of instructions, executable on said computer system, configured to perform said switchover operation in response to said indication, wherein
said computer code configured to cause said processor to perform said switchover operation is further configured to switch a coupling of said forwarding engine between a first interface card and a second interface card,
said switchover operation is performed independently of another switchover operation,
said another switchover operation is performed by another forwarding engine, and
said ingress path and said egress path are configured to be reprogrammed independently of one another;
a third set of instructions, executable on said computer system, configured to receive said indication that said forwarding engine has completed said switchover operation; and
a fourth set of instructions, executable on said computer system, configured to acknowledge said indication that said forwarding engine has completed said switchover operation.

22. The computer program product of claim 21, wherein
said forwarding engine is a one of a plurality of forwarding engines, and
each of said forwarding engines are configured to receive said indication that said forwarding engine has completed said switchover operation.

23. The computer program product of claim 22, further comprising:
a fifth set of instructions, executable on said computer system, configured to acknowledge that said forwarding engine has completed said switchover operation.

24. An apparatus comprising:

means for receiving an indication that a forwarding engine should perform a switchover operation;
means for performing said switchover operation, wherein
said means for performing said switchover operation is coupled to said means for receiving said indication,
said switchover operation comprises switching a coupling of said forwarding engine between a first interface card and a second interface card,
said switchover operation is performed independently of another switchover operation, and
said another switchover operation is performed by another forwarding engine;
means for receiving said indication that said forwarding engine has completed said switchover operation; and
means for acknowledging said indication that said forwarding engine has completed said switchover operation.

25. The apparatus of claim 24, wherein
said forwarding engine comprises an ingress path and an egress path, and
said means for performing said switchover operation comprises
means for reprogramming said ingress path; and
means for reprogramming said egress path.

26. The apparatus of claim 25, wherein said means for reprogramming said ingress path and said means for reprogramming said egress path operate independently of one another.

27. An apparatus comprising:
means for receiving an indication that a forwarding engine should perform a switchover operation;
means for performing said switchover operation, wherein
said means for performing said switchover operation is coupled to said means for receiving said indication,
said switchover operation comprises switching a coupling of said forwarding engine between a first interface card and a second interface card,
said switchover operation is performed independently of another switchover operation, and
said another switchover operation is performed by another forwarding engine;
means for indicating that said forwarding engine has completed said switchover operation; and
means for receiving said indication that said forwarding engine has completed said switchover operation; and
means for acknowledging said indication that said forwarding engine has completed said switchover operation.

28. The apparatus of claim 27, wherein
said forwarding engine is a one of a plurality of forwarding engines, and
each of said forwarding engines are configured to receive said indication that said forwarding engine has completed said switchover operation.

29. The apparatus of claim 28, further comprising:
means for acknowledging that said forwarding engine has completed said switchover operation.

30. The apparatus of claim 27, further comprising:
means for removing flow control between said forwarding engine and a forwarding engine that acknowledges that said forwarding engine has completed said switchover operation.

31. The apparatus of claim 30, wherein said means for removing flow control awaits an acknowledgement from said forwarding engine that acknowledges that said forwarding engine has completed said switchover operation prior to removing said flow control.

32. A method comprising:
receiving an indication that a forwarding engine has completed a switchover operation, wherein
said indication is received at a one of a plurality of forwarding engines, and
said forwarding engines comprise said forwarding engine; and
causing said one of said forwarding engines to acknowledge said indication in response to said receiving said indication that said forwarding engine has completed said switchover operation.

33. The method of claim 32, further comprising:
removing flow control between said forwarding engine and said one of said forwarding engines.

34. The method of claim 33, wherein said removing said flow control comprises:
receiving an indication that said forwarding engine should remove said flow control; and
causing said forwarding engine to remove said flow control in response to said indication that said forwarding engine should remove said flow control.

35. The method of claim 34, wherein said indication that said forwarding engine should remove said flow control is a receipt of a remove flow control message.

36. The method of claim 33, wherein said removing flow control is only performed after said one of said forwarding engines acknowledges said receiving said indication that said forwarding engine has completed said switchover operation.

37. A network element comprising:
a processor;
computer readable medium coupled to said processor; and
computer code, encoded in said computer readable medium, configured to cause said processor to:
receive an indication that a forwarding engine has completed a switchover operation, wherein
said indication is received at a one of a plurality of forwarding engines, and
said forwarding engines comprise said forwarding engine; and
cause said one of said forwarding engines to acknowledge said indication in response to said receiving said indication that said forwarding engine has completed said switchover operation.

38. The network element of claim 37, wherein said computer code is further configured to cause said processor to:
remove flow control between said forwarding engine and said one of said forwarding engines.

39. The network element of claim 38, wherein said computer code configured to cause said processor to remove flow control is further configured to cause said processor to:
receive an indication that said forwarding engine should remove said flow control; and
cause said forwarding engine to remove said flow control in response to said indication that said forwarding engine should remove said flow control.

40. The network element of claim 39, wherein said indication that said forwarding engine should remove said flow control is a receipt of a remove flow control message.

41. The network element of claim 38, wherein said computer code configured to cause said processor to remove flow control is only executed after said computer code configured to cause said processor to cause said one of said forwarding engines to acknowledge said indication.

42. A computer program product comprising:
a computer readable storage medium with computer readable program code stored thereon configured to cause said computer to execute a first set of instructions, executable on a computer system, configured to receive an indication that a forwarding engine has completed a switchover operation, wherein
said indication is received at a one of a plurality of forwarding engines, and
said forwarding engines comprise said forwarding engine; and
a second set of instructions, executable on said computer system, configured to cause said one of said forwarding engines to acknowledge said indication in response to said receiving said indication that said forwarding engine has completed said switchover operation.

43. The computer program product of claim 42, further comprising:
a third set of instructions, executable on said computer system, configured to remove flow control between said forwarding engine and said one of said forwarding engines.

44. The computer program product of claim 43, wherein said third set of instructions comprises:
a first subset of instructions, executable on said computer system, configured to receive an indication that said forwarding engine should remove said flow control; and
a second subset of instructions, executable on said computer system, configured to cause said forwarding engine to remove said flow control in response to said indication that said forwarding engine should remove said flow control.

45. The computer program product of claim 44, wherein said indication that said forwarding engine should remove said flow control is a receipt of a remove flow control message.

46. The computer program product of claim 43, wherein said third set of instructions is only executed after said second set of instructions.

47. An apparatus comprising:
means for receiving an indication that a forwarding engine has completed a switchover operation, wherein
said indication is received at a one of a plurality of forwarding engines, and
said forwarding engines comprise said forwarding engine; and
means for causing said one of said forwarding engines to acknowledge said indication in response to said receiving said indication that said forwarding engine has completed said switchover operation.

48. The apparatus of claim 47, further comprising:
means for removing flow control between said forwarding engine and said one of said forwarding engines.

49. The apparatus of claim 48, wherein said removing said flow control comprises:
means for receiving an indication that said forwarding engine should remove said flow control; and
means for causing said forwarding engine to remove said flow control in response to said indication that said forwarding engine should remove said flow control.

50. The apparatus of claim 49, wherein said indication that said forwarding engine should remove said flow control is a receipt of a remove flow control message.

51. The apparatus of claim 48, wherein said means for removing flow control only removes said flow control after said one of said forwarding engines acknowledges said receiving said indication that said forwarding engine has completed said switchover operation.

52. A method of failure recovery in a network element, the method comprising:
indicating to a plurality of forwarding engines that a forwarding engine has completed a switchover operation; and
causing at least one of said forwarding engines to acknowledge that said forwarding engine has completed said switchover operation in response to said indicating.

53. The method of claim 52, wherein
said indicating comprises
sending a first message from a route processor to said forwarding engines, wherein
said network element comprises said route processor communicatively coupled to said forwarding engines, and
said first message indicates that said forwarding engine has completed said switchover operation; and
said causing comprises
sending a second message from said at least one of said forwarding engines to said route processor, wherein
said second message indicates that said at least one of said forwarding engines acknowledges said forwarding engine has completed said switchover operation.

54. The method of claim 53, wherein said first message is a switchover advertise message.

55. The method of claim 54, wherein said second message is an advertise complete message.

56. The method of claim 53, wherein said forwarding engine is a one of said forwarding engines.

57. The method of claim 53, further comprising:
causing said forwarding engine to perform said switchover operation.

58. The method of claim 57, wherein said causing said forwarding engine to perform said switchover operation comprises:
sending a third message from said route processor to said forwarding engine, wherein said third message indicates that said forwarding engine should perform said switchover operation; and
causing said forwarding engine to perform said switchover operation in response to said first message.

59. The method of claim 58, wherein said third message is a switchover initiate message.

60. The method of claim 58, wherein said causing said forwarding engine to perform said switchover operation further comprises:
sending a fourth message from said forwarding engine to said route processor, wherein said fourth message indicates to said route processor that said forwarding engine has completed said switchover operation.

61. The method of claim 60, wherein said fourth message is an FE reprogram complete message.

62. The method of claim 57, wherein said switchover operation comprises:
reprogramming said forwarding engine.

63. The method of claim 62, wherein said reprogramming said forwarding engine comprises:
reprogramming an ingress path of said forwarding engine; and
reprogramming an egress path of said forwarding engine.

64. The method of claim 53, further comprising:
removing flow control between said forwarding engine and at least one of said forwarding engines.

65. The method of claim 64, wherein said removing said flow control comprises:

sending a fifth message from said route processor to said forwarding engine, wherein said fifth message indicates that said forwarding engine should remove said flow control; and causing said forwarding engine to remove said flow control in response to said fifth message.

66. The method of claim 65, wherein said fifth message is a remove flow control message.

67. The method of claim 64, wherein said removing flow control is only performed after said at least one of said forwarding engines acknowledges that said forwarding engine has completed said switchover operation.

68. A network element comprising:
a route processor;
a plurality of forwarding engines coupled to said route processor, wherein
each of said forwarding engines comprises said processor coupled to a computer readable medium;
first computer code, encoded in said computer readable medium, coupled to said processor; and
said first computer code is configured to cause said route processor to:
indicate to a plurality of forwarding engines that a forwarding engine has completed a switchover operation; and
second computer code, encoded in said computer readable medium of one of said forwarding engines, configured to cause said route processor to:
cause said one of said forwarding engines to acknowledge that said forwarding engine has completed said switchover operation in response to said indicating.

69. The network element of claim 68, wherein
said first computer code configured to cause said route processor to indicate is further configured to cause said processor to:
send a first message from said route processor to said forwarding engines, wherein
said first message indicates that said forwarding engine has completed said switchover operation; and
said second computer code configured to cause said one of said forwarding engines to acknowledge is further configured to cause said processor to:
sending a second message from said one of said forwarding engines to said route processor, wherein
said second message indicates that said one of said forwarding engines acknowledges said forwarding engine has completed said switchover operation.

70. The network element of claim 69, wherein said forwarding engine is another of said forwarding engines.

71. The network element of claim 69, wherein third computer code, encoded in said computer readable medium of said forwarding engine, is configured to cause said forwarding engine to:
cause said forwarding engine to perform said switchover operation.

72. The network element of claim 71, wherein third computer code configured to cause said forwarding engine to perform said switchover operation is further configured to cause said forwarding engine to:
receive an indication that said forwarding engine should remove said flow control; and
cause said forwarding engine to remove said flow control in response to said indication that said forwarding engine should remove said flow control.

73. The network element of claim 72, wherein said third computer code configured to cause said forwarding engine to perform said switchover operation is further configured to cause said forwarding engine to:
send a fourth message from said forwarding engine to said route processor, wherein said fourth message indicates to said route processor that said forwarding engine has completed said switchover operation.

74. The network element of claim 72, wherein said third computer code configured to cause said forwarding engine to perform said switchover operation is further configured to cause said forwarding engine to:
reprogram said forwarding engine.

75. The network element of claim 74, wherein said third computer code configured to cause said forwarding engine to reprogram said forwarding engine is further configured to cause said forwarding engine to:
reprogram an ingress path of said forwarding engine; and
reprogram an egress path of said forwarding engine.

76. The network element of claim 75, wherein said third computer code configured to cause said forwarding engine to remove flow control is further configured to cause said forwarding engine to:
receive a fifth message from said route processor at said forwarding engine, wherein said fifth message indicates that said forwarding engine should remove said flow control; and
causing said forwarding engine to remove said flow control in response to said fifth message.

77. The network element of claim 74, wherein said third computer code is further configured to cause said forwarding engine to:
remove flow control between said forwarding engine and said one of said forwarding engines.

78. An apparatus for failure recovery in a network element, the apparatus comprising:
means for indicating to a plurality of forwarding engines that a forwarding engine has completed a switchover operation; and
means for causing at least one of said forwarding engines to acknowledge that said forwarding engine has completed said switchover operation in response to said indicating.

79. The apparatus of claim 78, wherein
means for said indicating comprises
means for sending a first message from a route processor to said forwarding engines, wherein
said network element comprises said route processor communicatively coupled to said forwarding engines, and
said first message indicates that said forwarding engine has completed said switchover operation; and
means for said causing comprises
means for sending a second message from said at least one of said forwarding engines to said route processor, wherein
said second message indicates that said at least one of said forwarding engines acknowledges said forwarding engine has completed said switchover operation.

80. The apparatus of claim 79, wherein said forwarding engine is a one of said forwarding engines.

81. The apparatus of claim 79, further comprising:
means for causing said forwarding engine to perform said switchover operation.

82. The apparatus of claim 81, wherein said means for causing said forwarding engine to perform said switchover operation comprises:
- means for sending a third message from said route processor to said forwarding engine, wherein said third message indicates that said forwarding engine should perform said switchover operation; and
- means for causing said forwarding engine to perform said switchover operation in response to said first message.

83. The apparatus of claim 82, wherein said means for causing said forwarding engine to perform said switchover operation further comprises:
- means for sending a fourth message from said forwarding engine to said route processor, wherein said fourth message indicates to said route processor that said forwarding engine has completed said switchover operation.

84. The apparatus of claim 81, wherein said means for causing said forwarding engine to perform said switchover operation comprises:
- means for reprogramming an ingress path of said forwarding engine; and
- means for reprogramming an egress path of said forwarding engine.

85. The apparatus of claim 79, further comprising:
- means for removing flow control between said forwarding engine and at least one of said forwarding engines.

86. The apparatus of claim 85, wherein said means for removing said flow control comprises:
- means for sending a fifth message from said route processor to said forwarding engine, wherein said fifth message indicates that said forwarding engine should remove said flow control; and
- means for causing said forwarding engine to remove said flow control in response to said fifth message.

87. A forwarding engine comprising:
- an ingress path;
- an egress path; and
- a controller, wherein
  - said ingress path and said egress path are independent from one another,
  - said controller is coupled to control said ingress path and said egress path independently,
  - said ingress path comprises an inbound processing element,
  - said egress path comprises an outbound processing element,
  - said ingress path further comprises an inbound selector coupled to said inbound processing element,
  - said egress path further comprises an outbound selector coupled to said outbound processing element,
  - said inbound selector is configured to couple said inbound processing element to one of a first interface unit and a second interface unit, and
  - said outbound selector is configured to couple said outbound processing element to one of said first interface unit and said second interface unit.

88. The forwarding engine of claim 87, wherein
said forwarding engine is capable of acting as one of a primary forwarding engine and a standby forwarding engine.

89. The forwarding engine of claim 87, wherein
said inbound processing element comprises a first cache memory, and
said outbound processing element comprises a second cache memory.

90. The forwarding engine of claim 89, wherein
said forwarding engine is configured to store first configuration information in said first cache and second configuration information in said second cache, and
said first configuration information and said second configuration information representing a first configuration of said forwarding engine.

91. The forwarding engine of claim 90, wherein
said forwarding engine is further configured to store third configuration information in said first cache and fourth configuration information in said second cache, and
said third configuration information and said fourth configuration information representing a second configuration of said forwarding engine.

92. The forwarding engine of claim 91, wherein
said forwarding engine is configured to switch between said first configuration of said forwarding engine and said second configuration of said forwarding engine by virtue of being configured to use said third configuration information stored in said first cache, and use said fourth configuration information stored in said second cache.

93. The forwarding engine of claim 90, further comprising:
a memory, coupled to said controller.

94. The forwarding engine of claim 93, wherein
said controller is configured to store third configuration information and fourth configuration information in said memory, and
said third configuration information and said fourth configuration information representing a second configuration of said forwarding engine.

95. The forwarding engine of claim 94, wherein
said forwarding engine is configured to switch between said first configuration of said forwarding engine and said second configuration of said forwarding engine by virtue of being configured to copy said third configuration information from said memory to said first cache, and to copy said fourth configuration information from said memory to said second cache.

* * * * *